A. SONANDER.
KNIFE EDGE BEARING.
APPLICATION FILED MAR. 22, 1909.
949,094.
Patented Feb. 15, 1910.
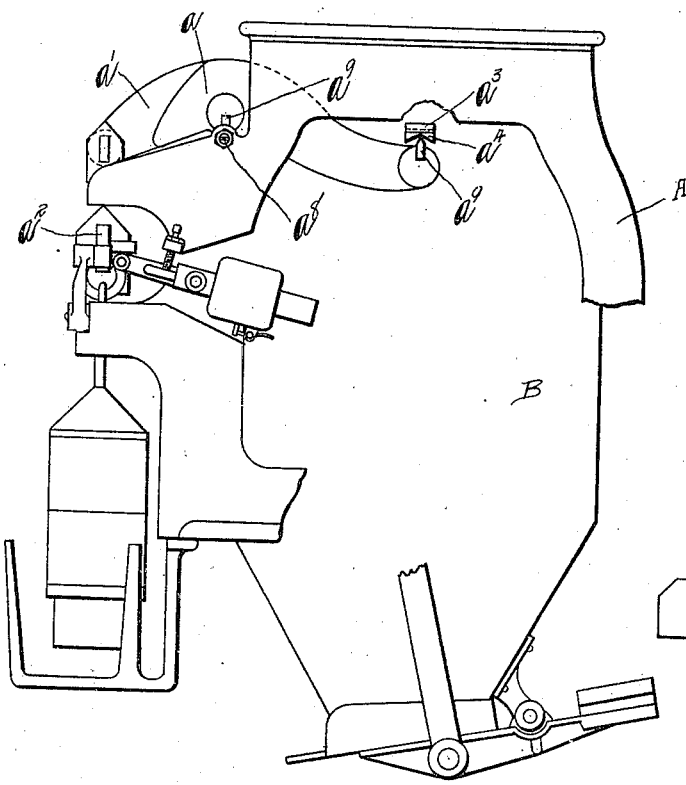
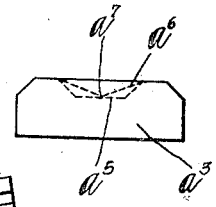
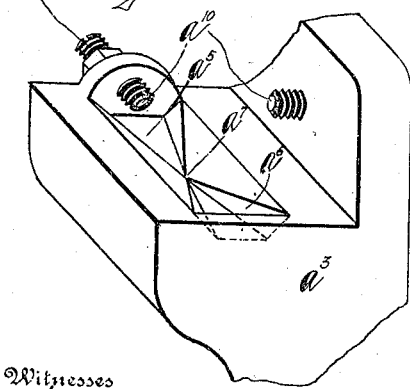
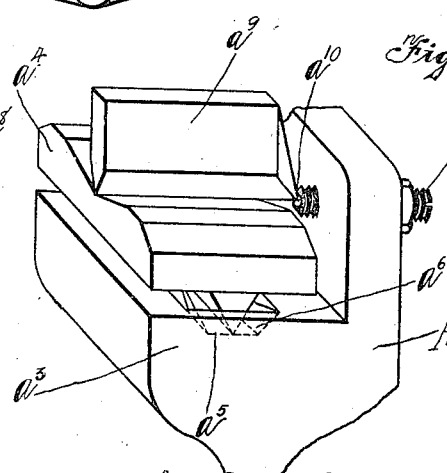
Witnesses
Oliver T. Clarke
Chas. I. Welch
Inventor
Andrew Sonander
By Staley & Borman
Attorneys

UNITED STATES PATENT OFFICE.

ANDREW SONANDER, OF SPRINGFIELD, OHIO, ASSIGNOR TO THE WINTERS-COLEMAN SCALE COMPANY, OF SPRINGFIELD, OHIO, A CORPORATION OF OHIO.

KNIFE-EDGE BEARING.

949,094.  Specification of Letters Patent.  Patented Feb. 15, 1910.

Application filed March 22, 1909. Serial No. 484,943.

*To all whom it may concern:*

Be it known that I, ANDREW SONANDER, a citizen of the United States, residing at Springfield, in the county of Clark and State of Ohio, have invented certain new and useful Improvements in Knife-Edge Bearings, of which the following is a specification.

My improvement relates to a bearing—one especially adapted to automatic weighing machinery where there is danger of parts being thrown out of alinement and my bearing is a self-alining one.

In the drawings, Figure 1 is a side elevation of a weighing machine showing a plurality of bearings. Fig. 2 is an end view of the bearing block when used as a plate. Fig. 3 is a detail view of the bearing block and plate. Fig. 4 is a perspective view of the bearing block seat.

Like parts are represented by like characters of reference.

In my improved machine the stationary frame is indicated by A and the movable hopper for weighing the grain is indicated by B. The general arrangement of the parts is fully described in my pending application, being Ser. No. 409,109.

Referring to Fig. 1, the frame for supporting the movable hopper is indicated by $a$, having an arm, $a^1$, projecting beyond the fulcrum point constituting the connection between the weigh beam, $a^2$, and the movable supporting frame, $a$. These parts and their connections are fully described in said pending application. In the actual operation of this class of machinery it is found that the bearings must be maintained as nearly true as possible and after a short period of use the bearings are thrown out of alinement unless special provision is made to overcome that difficulty. The bearing block seat, (Fig. 3) as indicated by $a^3$, is preferably cast in the stationary frame or hopper, as the case may be, and has peculiar formations adapting it to coöperate with the bearing block, $a^4$, so as to insure a self-alinement of the parts in actual use permitting the bearing block, $a^4$, to operate as a universal bearing. The pivot plate, $a^9$, is formed wedge-shaped and the knife-edge point of said pivot or plate fits within the groove formed in the top of the bearing block, $a^4$.

As will be seen from an examination of Figs. 2, 3 and 4 the knife-edge of the bearing block is formed so that the edge may rest upon the flat surface, $a^5$, of the block seat, $a^3$, and the sides or walls, $a^6$, are inclined or tapered so as to meet at a point $a^7$. The improved result, due to the formation of the bearing block seat, $a^3$, is that the knife-edge of the bearing block, $a^4$, will aline itself at all times while the seat will permit a limited radial movement of the knife-edge about the central point, $a^7$, and yet in every position assumed by the knife-edge the same will be properly supported in the bearing block seat, $a^3$.

As shown in Figs. 3 and 4, I preferably employ set screws, $a^8$, which extend through a stationary part, and the ends $a^{10}$, bear against the end of the pivot plane, $a^9$, and also against the end of the knife-edge of the bearing block, $a^4$. The purpose of this construction is to prevent the bearing block, $a^4$, moving longitudinally in its seat or the pivot plate moving longitudinally in the bearing block.

Having thus described my invention, I claim:—

1. In a device of the character described, the combination of a pivot plate with a bearing, a seat for same having a central portion, the sides of said seat converging to a point substantially centrally located with reference to the seat, a knife edge projecting from the bearing and adapted to project within the seat whereby the converging sides of the seat will permit a limited radial movement about said central point, substantially as specified.

2. In a device of the character described, the combination of a seat, a central recessed portion having sides converging to a point substantially centrally located, a bearing with a knife edge projecting from its lower portion adapted to fit within the seat, a groove formed in the top portion of said bearing of the knife edge adapted to fit within said groove.

3. In a device of the character described, the combination of a seat, a central recessed portion having sides converging to a point substantially centrally located, a bearing with a knife edge projecting from its lower portion adapted to fit within the seat, a groove formed in the top portion of said bearing of the knife edge adapted to fit within said groove, means for preventing longitudinal movement of the block within the seat, and means for preventing longitudinal movement of the knife edge within the bearing, substantially as specified.

In testimony whereof, I have hereunto set my hand this 18th day of March 1909.

ANDREW SONANDER.

Witnesses:
 CHAS. I. WELCH,
 OLIVER T. CLARKE.